W. R. STANFIELD.
CULTIVATOR ATTACHMENT.
APPLICATION FILED SEPT. 7, 1918.

1,320,507.

Patented Nov. 4, 1919.
2 SHEETS—SHEET 1.

INVENTOR:
W. R. STANFIELD
By
Earl M. Sinclair
Atty.

W. R. STANFIELD.
CULTIVATOR ATTACHMENT.
APPLICATION FILED SEPT. 7, 1918.

1,320,507.

Patented Nov. 4, 1919.
2 SHEETS—SHEET 2.

INVENTOR:
W. R. STANFIELD
By
Earl M. Sinclair
Atty.

UNITED STATES PATENT OFFICE.

WILLIAM R. STANFIELD, OF UNION, IOWA.

CULTIVATOR ATTACHMENT.

1,320,507. Specification of Letters Patent. Patented Nov. 4, 1919.

Application filed September 7, 1918. Serial No. 253,022.

*To all whom it may concern:*

Be it known that I, WILLIAM R. STANFIELD, a citizen of the United States of America, and resident of Union, Hardin county, Iowa, have invented a new and useful Cultivator Attachment, of which the following is a specification.

The object of this invention is to provide an improved cultivator attachment particularly adapted for use in fields infested with vines such as wild morning-glories, wild peas and the like.

A further object of this invention is to provide an improved cultivating implement for destroying weeds such as wild morning-glory vines.

A further object of this invention is to provide improved means for mounting the cultivating blades.

A further object of this invention is to provide improved means for mounting the cultivating blades in sets adapted to straddle a corn row, and means for adjusting the sets laterally to vary their distance from the row.

A further object of this invention is to provide improved means for adjusting the blades as to inclination relative to the line of draft.

A further object of this invention is to provide improved means for adjusting the blades as to inclination from the perpendicular.

My invention consists in the construction, arrangement and combination of elements hereinafter set forth, pointed out in my claims and illustrated by the accompanying drawing, in which—

Figure 1:
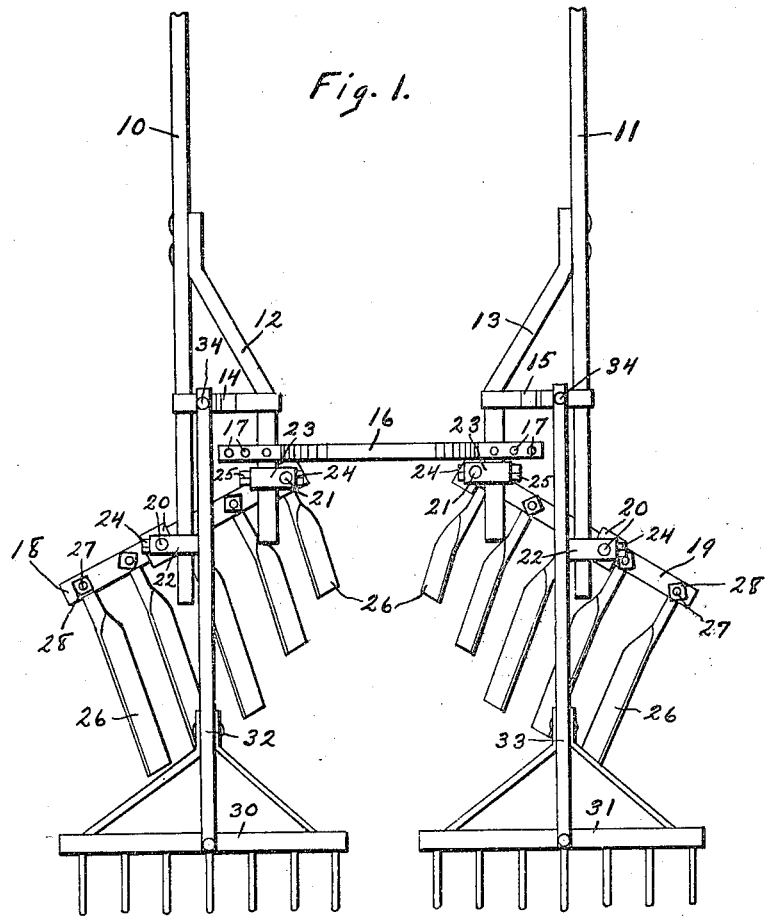
Figure 2:
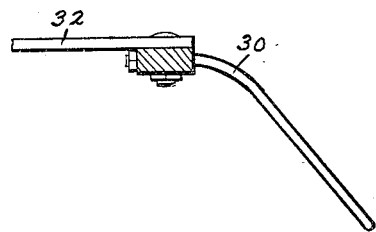
Figure 3:
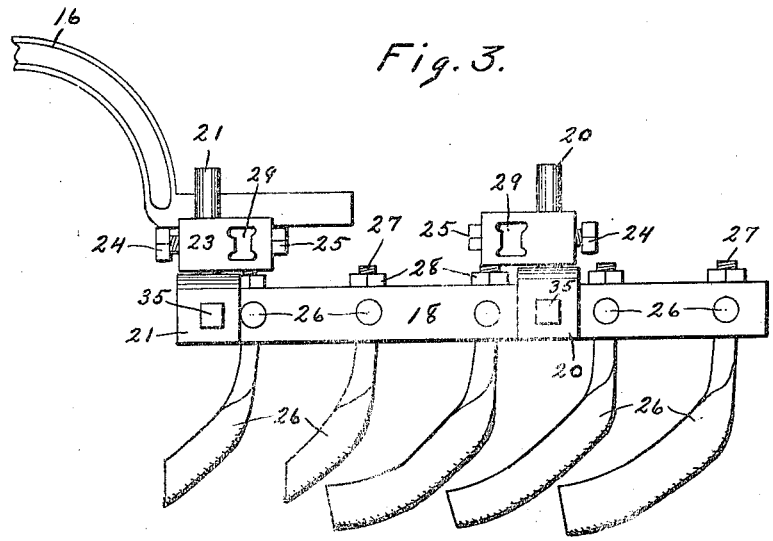
Figure 4:
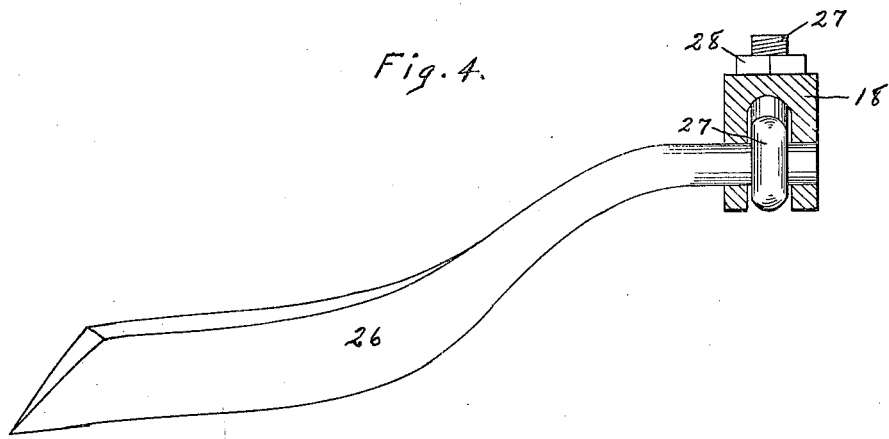

Figure 1 is a plan showing a portion of a cultivator frame equipped with my improved cultivating devices. Fig. 2 is a side elevation of one of the follower rakes, partly in section, and on an enlarged scale. Fig. 3 is a front view of one set of the cultivating devices mounted as required for practical use, and also showing a portion of the arch connecting the two sets of devices. This view is on a scale enlarged relative to Fig. 1. Fig. 4 is a side elevation, partly in section, showing one of the blades and the means for mounting same, on a further enlarged scale.

In the construction of the devices as shown the numerals 10, 11 designate shovel beams, preferably forked at their rear end portions by the addition of inwardly offset branches 12, 13 respectively, having their main portions extending parallel with and spaced from the main portions of the beams and in the same horizontal plane, and also connected thereto by cross-bars 14, 15. The shovel beams 10, 11 are connected in a common manner to a cultivator frame at their forward ends, preferably being pivoted for oscillation on vertical axes and also vertically adjustable on said frame, which construction forms no part of my present invention. The shovel beams 10, 11 are connected transversely near their rear ends by an arch 16, preferably formed with horizontal end portions overlying and adapted to be bolted to the branch beams 12, 13, said end portions of the arch being formed with a plurality of holes 17 to provide for adjustment of the lateral distance between the members connected by said arch. U-bars 18, 19 are mounted across and beneath rear portions of the shovel beams 10, 11 and are adjustably connected thereto, and said U-bars are arranged in inverted form and are adapted to carry the cultivating devices. To provide for connecting the U-bars to the shovel beams, two jawed spindles, designated by the numerals 20, 21, are mounted on and connected to each of the said U-bars, the jaws thereof embracing and bolted to the U-bars by bolts 35 and the spindles extending upwardly therefrom. Bearing blocks 22, 23 are formed with vertical apertures through which the spindles 20, 21 are passed, and said blocks are adjustably secured to said spindles by means of set screws 24. The jawed spindles 20, 21 are spaced apart on the U-bars 18, 19, one preferably being adjacent the inner end of each U-bar and the other outside of the middle thereof, such spacing corresponding to the spacing of the branches 12, 13 from the main portions of the shovel beams 10, 11, approximately. The bearing blocks 22, 23 also are formed with horizontal apertures 29 through which pass the various members of the two forked shovel beams 10, 11, which are secured in said blocks adjustably by means of set screws 25. By turning the bearing blocks 22, 23 through arcs on the spindles and sliding the beam members therethrough, at the same time loosening the bolts 35 so the jawed spindles or either of them, may shift slightly on the U-bars, the inclination of the U-bars 18, 19 relative to the line of draft may be adjusted. Each U-bar 18, 19 is formed with a plurality of spaced holes extending therethrough from front to back in horizontal planes, and the cultivating devices or blades 26 are adapted to be secured in said holes. The blades 26 are relatively long and narrow and are formed with rounded stems at their forward ends seated in the holes in the U-bars, are offset downwardly and gradually flattened out and are beveled on their lower margins. Eyebolts 27 are mounted in the U-bars 18, 19 and the rounded stems of the blades 26 pass through the eyes of said bolts, the stems of which pass upwardly through the tops of the U-bars, are threaded, and have nuts 28 mounted on their upper ends. The nuts 28 are tightened against the tops of the U-bars to frictionally hold the blades 26 in any position in which they may be adjusted. The forward ends of the blades 26 preferably do not project beyond but are flush with the forward surface of the U-bars, as it is desirable to have such forward surfaces smooth and without projections on which vines could catch and drag.

Rakes 30, 31 preferably are provided, each having a forwardly extending beam 32, 33 connected at its forward end to the shovel beams 10, 11 pivotally by bolts 34 passing through the cross-bars 14, 15. The rakes 30, 31 may be of any desired form and construction, and are arranged to trail the two sets of cultivating devices and gather up any loose vines and weeds that may be left, and also to pull out any such which may not be entirely dislodged by the blades.

In practical use the parts are assembled as shown, the shovel beams being connected to any suitable form of cultivator frame. The two sets of blades 26 are carried on opposite sides of a corn or other row and are inclined toward such row at their rear ends. The blades also are inclined from a vertical position in their flattened portions, so that they shave, shear and cut the surface of the ground and cut off vines and weeds. The sets of blades may be adjusted toward or away from each other by adjustment of the connections of the arch 16. The inclination of the U-bars, and consequently of the blades 26 relative to the line of draft, may be adjusted by loosening the set screws 25. It is to be understood that the common means may be employed for manually controlling the cultivating devices in use.

It will readily be observed that this device is especially effective for surface cultivation and for the removal of weeds such as morning-glory vines, its convenience and effectiveness being increased by the variety of adjustment provided, as well as the peculiar shape of the cultivating blades.

The blades 26 preferably are twisted between their stems and the flattened portions, so that the flattened or cutting portions may readily be arranged to lie rather flat relative to the surface being cultivated.

I claim as my invention—

1. A device of the class described, comprising spaced shovel beams, bars arranged transversely of said shovel beams, bearing blocks carried by said beams, clips on and adjustable longitudinally of said bars, each of said clips having an integral upstanding spindle seated in one of said bearing blocks, means being provided for securing said bearing blocks on said spindles, and a plurality of cultivating devices carried by each of said bars.

2. A device of the class described, comprising a shovel beam, a U-bar arranged transversely thereof, a jawed spindle having its jaw embracing and secured to said U-bar, a bearing block secured on and adjustable circumferentially of said spindle, means for securing said shovel beam in said bearing block, and blades secured in and extending rearwardly from said U-bar.

3. In a device of the class described, the combination with a cultivator beam and cross-head extending transversely thereof and adapted to carry cultivating devices, of means for adjustably securing said cross-head to said beam, comprising a clip embracing said cross-head, securing means for connecting said clip to said cross-head, said clip being formed with an upwardly projecting spindle, a bearing block through which said shovel beam extends, securing means for connecting said bearing block to said beam, said spindle also extending through said bearing block, and securing means for connecting said bearing block on said spindle.

Signed at Des Moines, in the county of Polk and State of Iowa, this 26th day of August, 1918.

WILLIAM R. STANFIELD.

Copies of this patent may be obtained for five cents each, by addressing the "Commissioner of Patents, Washington, D. C."